Figure 1:
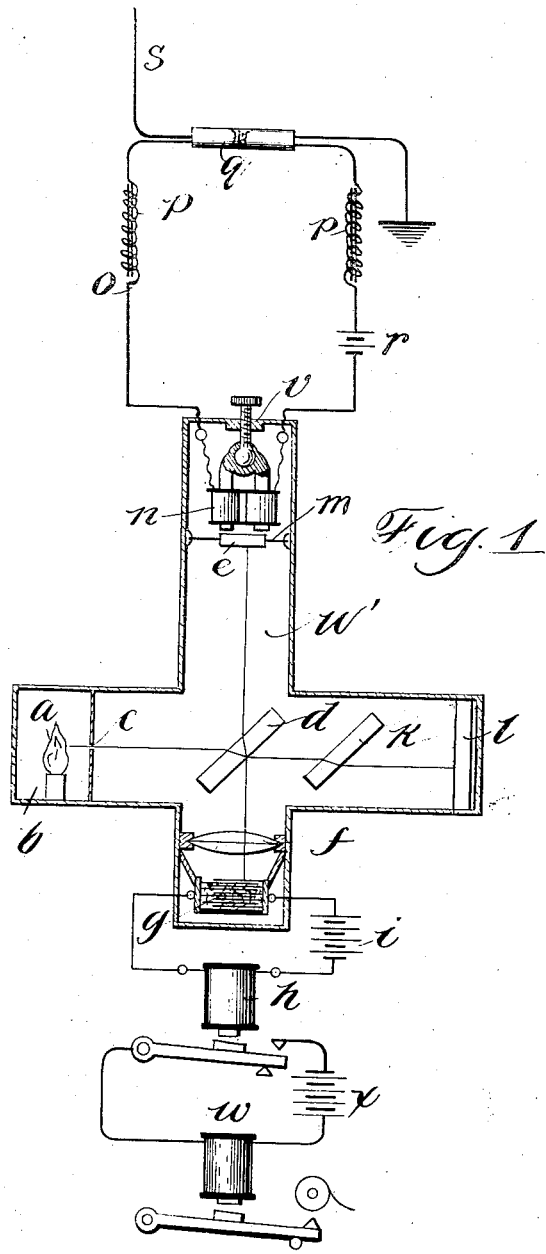

C. G. ASHLEY.
RECEIVER.
APPLICATION FILED JAN. 10, 1906.

908,725.

Patented Jan. 5, 1909.

Witnesses:
Chas. F. Bassett
F. R. Stroh

Inventor:
Charles G. Ashley
By G. L. Cragg
Attorney

UNITED STATES PATENT OFFICE.

CHARLES G. ASHLEY, OF CHICAGO, ILLINOIS.

RECEIVER.

No. 908,725.  Specification of Letters Patent.  Patented Jan. 5, 1909.

Application filed January 10, 1906. Serial No. 295,485.

*To all whom it may concern:*

Be it known that I, CHARLES G. ASHLEY, citizen of the United States, residing at Chicago, in the county of Cook and State of Illinois, have invented a certain new and useful Improvement in Receivers, of which the following is a full, clear, concise, and exact description, reference being had to the accompanying drawings, forming a part of this specification.

My invention relates to an apparatus for receiving electrical energy and manifesting the presence thereof, and has for its object to secure manifestations due to very minute mechanical movement effected by the incoming current.

The invention is of particular service in manifesting the presence of very minute incoming current, of wave or other form, though the invention is not to be restricted to its utility in connection with such minute current.

In practicing my invention, I operate one of the mirrors of an instrument similar, for example, to that of Michelson's and Morley's interferometer, described in Article 108, commencing page 104 of Volume III of Nichols and Franklin's work *The Elements of Physics*, published in 1904. Instruments of this class are also well described by A. A. Michelson in his work *Light Waves and Their Uses*, published in 1903. One of the mirrors of the interferometer I desirably reconstruct and remount so that it may be very light, and, therefore, very easily moved by the action of incoming current. This movement of the mirror may be effected preferably electromagnetically or electro-statically, and the mirror is so mounted that when there is no incoming current, it will assume its normal position. As is well known, the interferometer includes a source of light, I preferably employ a sodium light, and two pieces of plate glass one-fourth of an inch thick are placed in the path of a ray of light issuing from this source. One of said plates of glass directs light upon the mirror that is moved by the incoming current and also upon the companion mirror, the second plate of glass serving to compensate for the extra thickness of glass which the first portion of the ray has traversed. The light that is reflected from the electrically operable mirror and the light that is reflected from the companion mirror, constitute components that produce a resultant. In the preferred practice of the invention when the electrically operable mirror is in its normal position, the light it reflects is in phase with the light the companion mirror reflects, so that these two components will form a resultant which is brighter than either of the components, as is understood by physicists. This fluctuating resultant I employ in operating a suitable receiving instrument, and the agency through which this resultant preferably operates the receiving instrument includes a selenium cell in circuit with the receiving instrument, the resultant light being directed upon the cell.

In order that the greatest efficiency may be secured, I preferably employ a lens that is placed in the path of the resultant light, through which lens the light passes before it reaches the selenium cell. It has been estimated that well constructed selenium cells may have two hundred times the current carrying capacity when subject to day light than when the cells are in total darkness, so it will be seen that the receiver in circuit with a selenium cell and a suitable source of current also in circuit with said cell, will be very readily operated as a result of the fluctuation in the strength of the resultant light, which fluctuation is secured as above described. The receiver may be of any suitable form, depending upon the class of service to which the instrument is adapted; in telegraph service, it may be a receiving magnet which may, if desired, be supplemented by a sounder magnet; or an indicating instrument may be included in the circuit of the selenium cell or a telephone instrument.

I will explain my invention more fully by reference to the accompanying drawing, in which—

Figure 2:
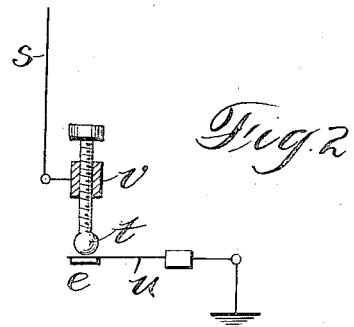
Figure 3:
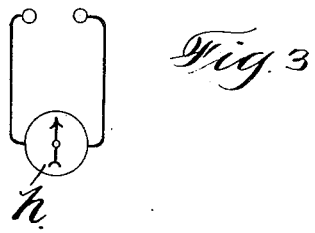
Figure 4:
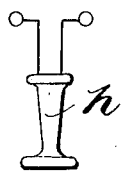

Figure 1 shows one embodiment thereof. Fig. 2 indicates a modification of a portion of the apparatus shown in Fig. 1. Fig. 3 indicates a different type of receiver than that shown in Fig. 1. Fig. 4 indicates still another type of receiver.

Like parts are indicated by similar characters of reference throughout the different figures.

While the instrument I have illustrated possesses structural characteristics of a well known form of interferometer, I do not wish to be limited to such structural characteristics. Moreover, the instrument I employ need not be an interferometer, for its function is not that of any sort of meter, but its function is to take part in suitably receiving and reproducing signals. The interferometer is serviceable with the aid of the eye or photographic plate. The instrument I employ, of course, is not made use of in this way.

Referring first more particularly to Fig. 1, some suitable source of light $a$ is illustrated, that may be contained in a closed compartment having only a slight opening $c$ through which a ray or concentrated pencil of light finds access into the balance of the interior of the instrument. The light passes through to the rear and reflecting surface of the plate of glass $d$ and there separates, a part of the light being reflected to the mirrored surface, which is the front of the mirror $e$, these mirrored surfaces preferably having full mirror effect, the light returning on its path through the glass $d$, from whence it is directed to the lens $f$, that is desirably, though not necessarily, employed, the light continuing to the selenium cell $g$ included in circuit with some suitable form of receiver, as an electro-magnet $h$, illustrated in Fig. 1, and a battery $i$, for the purposes hereinafter to be set forth. The other part of the ray goes through the glass plate $d$ and passes through the glass plate $k$ and is reflected by the mirror $l$, returning on its path to the starting point at $d$, so as to nearly or practically coincide with the aforesaid ray that was passed through the lens $f$ and to the cell $g$. The rays thus reflected by the mirrors $e$ and $l$ are component rays, the light that finds its way from the plate $d$ and the lens $f$ and to cell $g$ being a resultant of these two component rays, and, in order that the two component rays may properly merge to form the resultant, the reflecting surfaces of the mirrors $l$ and $e$ are desirably placed exactly at right angles, though this arrangement need not be most strictly adhered to. I do not wish to be limited to this exact right angular arrangement of the mirrors $e$ and $l$, for in practice if these mirrors are not exactly at right angles, the structure of my invention will still be operative, as will be apparent to those skilled in the art.

Either of the mirrors $e$ or $l$ may be moved as a result of the incoming current, which current preferably operates electro-magnetically or electro-statically. I have shown the mirror $e$, for the sake of illustration, as the one that is thus operated by the incoming current.

In the form shown in Fig. 1, the mirror $e$ is mounted upon a flexible supporting member $m$, which may comprise an armature for the electro-magnet $n$ included in the instruments shown in Fig. 1 in a locally closed circuit $o$ containing the impedance $p$ and a coherer $q$ of a well known type, and a battery $r$, this being a well known wireless receiving circuit to which my invention is not limited. The aerial conductor in the case of the wireless apparatus is shown at $s$, this aerial conductor being grounded through the coherer. The aerial conductor $s$ shown in Fig. 2 is connected with an electro-static terminal $t$ opposed to but normally slightly separated from the electro-static grounded armature $u$, whereby the armature $u$ is electro-statically operated rather than magnetically operated, as is the case in Fig. 1.

The elements $n$ and $t$ are adjustable by means of threaded shafts $v$ working within suitable threaded mountings, so that the distance between the armatures carrying the mirrors $e$ and the actuating elements $n$ and $t$ may be so regulated as to limit the range of operation of the mirrors $e$ to one-half of the length of the light wave used. By this arrangement the strongest incoming current may be prevented from operating the mirror more than the distance of one-half of the length of the wave of the light chosen. Of course, it is understood that the motion of the mirror $e$ is not mechanically limited by this adjustment but rather that the tractive effort of the element $n$ or $t$ is controlled by regulating its distance from the mirror. For example, yellow light has a wave length of .58 microns. When yellow light is used, therefore, the mirror $e$ of my apparatus should have a maximum movement of .29 microns. If light of other color is used, the mirror $e$ should have a maximum movement corresponding to one-half of the wave length of such light.

While I have shown aerial conductors $s$ and arrangements thereof peculiar to wireless communication, I do not wish to be limited to such apparatus, the illustrations chosen being merely for the sake of clearly explaining the invention.

It will be seen that the incoming current, in the instance shown received by the wire $s$, will effect the operation of the mirror $e$, which operation, in Fig. 1, is accomplished through the aid of the magnet $n$, and, in Fig. 2, by electro-static action between the elements $t$ and $u$. If the mirror $e$ is normally set so that the reflected rays from the mirrors $e$ and $l$ constituting the components above spoken of, are in phase, the strongest resultant light is directed upon the cell $g$. By a maximum motion of the mirror $e$ to one-half of the length of the light wave used, the components are displaced one hundred eighty degrees in phase, and the weakest resultant light is directed upon the cell $g$. As the mirror $e$ is moved between its normal position and its position of greatest displacement, the degree of phase displacement of the component rays is varied, so that the resultant light is correspondingly varied. Thus, the resultant light is varied in correspondence to the incoming current and effects a change in the resistance of the selenium cell $g$ in correspondence to the incoming current, and, as the resistance of such selenium cell has a wide range of variation, the circuit containing the receiving element $h$ has its resistance changed throughout a wide range, for the selenium cell is desirably included in series in the circuit containing said receiver $h$. This receiver $h$ may be of any suitable form; in Fig. 1 it is shown as the receiving magnet of a telegraph outfit, the sounder or recording magnet $w$ being included in circuit with a battery $x$, that is closed each time the armature of the relay $h$ is attracted. The system shown in Fig. 1, therefore, is arranged for telegraphic service. Any other suitable form of signal receiver, such as the indicator or galvanometer shown in Fig. 3, may be substituted for the receiver shown in Fig. 1. The telephone receiver shown in Fig. 4 may be substituted for the element $h$ of Fig. 1, in which case the system may be adapted to telephone practice.

The elements $n, e, m, a, d, k, l, f$ and $g$ are desirably inclosed in a light-proof box. The presence of diffused light within the box is desirably prevented.

The base $w^1$ is desirably made of metal so that the relations of the parts may be stable.

While I have described the mirror $e$ as being capable of operation by the incoming current to an extent corresponding to one-half of the length of the light wave used, it is obvious that this maximum movement of the mirror is not required in all cases, for any range of movement of the mirror $e$ within the limits that have been specified may be rendered effective at the cell $g$, in a manner that has been set forth.

In the claims I use the term "signal translating device" in the sense of any suitable signal instrument, whether such instrument is adapted to receive telegraphic signals or telephonic signals or speech. This translating device, in the form shown, comprises the elements $g$, $h$ and $i$, whether the element $h$ be associated with supplementary apparatus $w$—$x$ or not.

While I have herein shown and particularly described one type of apparatus with which my invention may be practiced, I do not wish to be limited to the precise embodiment of the invention illustrated, but,

Having thus described my invention, I claim as new and desire to secure by Letters Patent:

1. A receiving apparatus of the class described, including a source of light, an electrically operated mirror located in association with said light, subject to incoming current, for governing a ray from said light, a second mirror, said mirrors being so arranged that they reflect rays, the reflected rays constituting component rays for producing a resultant, and a signal translating device subject to the resultant.

2. A receiving apparatus of the class described, including a source of light, an electrically operated mirror located in association with said light, subject to incoming current, for governing a ray from said light, a second mirror, said mirrors being so angularly arranged that they reflect rays, the reflected rays constituting component rays for producing a resultant, and a signal translating device subject to the resultant.

3. A receiving apparatus of the class described, including a source of light, an electrically operated mirror located in association with said light, subject to incoming current, for governing a ray from said light, a second mirror, said mirrors being so arranged that they reflect rays, the reflected rays constituting component rays for producing a resultant, an element $d$ serving to divide the light emanating from the source into two distinct pencils and to direct the same upon said mirrors, and a signal translating device subject to the resultant.

4. A receiving apparatus of the class described, including a source of light, an electrically operated mirror located in association with said light, subject to incoming current, for governing a ray from said light, a second mirror, said mirrors being so angularly arranged that they reflect rays, the reflected rays constituting component rays for producing a resultant, an element $d$ serving to divide the light emanating from the source into two distinct pencils and to direct the same upon said mirrors, and a signal translating device subject to the resultant.

5. A receiving apparatus of the class described, including a source of light, an electrically operated mirror located in association with said light, subject to incoming current, for governing a ray from said light, a second mirror, said mirrors being so arranged that they reflect rays, the reflected rays constituting component rays for producing a resultant, and a signal translating device subject to the resultant, said signal translating device including a material whose resistance varies upon variation of the light to which it is subject.

6. A receiving apparatus of the class described, including a source of light, an electrically operated mirror located in association with said light, subject to incoming current, for governing a ray from said light, a second mirror, said mirrors being so angularly arranged that they reflect rays, the reflected rays constituting component rays for producing a resultant, and a signal translating device subject to the resultant, said signal translating device including a material whose resistance varies upon variation of the light to which it is subject.

7. A receiving apparatus of the class described, including a source of light, an electrically operated mirror located in association with said light, subject to incoming current, for governing a ray from said light, a second mirror, said mirrors being so arranged that they reflect rays, the reflected rays constituting component rays for producing a resultant, an element $d$ serving to divide the light emanating from the source into two distinct pencils and to direct the same upon said mirrors, and a signal translating device subject to the resultant, said signal translating device including a material whose resistance varies upon variation of the light to which it is subject.

8. A receiving apparatus of the class described, including a source of light, an electrically operated mirror located in association with said light, subject to incoming current, for governing a ray from said light, a second mirror, said mirrors being so angularly arranged that they reflect rays, the reflected rays constituting component rays for producing a resultant, an element $d$ serving to divide the light emanating from the source into two distinct pencils and to direct the same upon said mirrors, and a signal translating device subject to the resultant, said signal translating device including a material whose resistance varies upon variation of the light to which it is subject.

9. A receiving apparatus of the class described, including a source of light, an electrically operated mirror located in association with said light, subject to incoming current, for governing a ray from said light, a second mirror, said mirrors being so arranged that they reflect rays, the reflected rays constituting component rays for producing a resultant, a signal translating device subject to the resultant, said signal translating device including a material whose resistance varies upon variation of the light to which it is subject, a source of current, and an electro-magnetic device.

10. A receiving apparatus of the class described, including a source of light, an electrically operated mirror located in association with said light, subject to incoming current, for governing a ray from said light, a second mirror, said mirrors being so angularly arranged that they reflect rays, the reflected rays constituting component rays for producing a resultant, a signal translating device subject to the resultant, said signal translating device including a material whose resistance varies upon variation of the light to which it is subject, a source of current, and an electro-magnetic device.

11. A receiving apparatus of the class described, including a source of light, an electrically operated mirror located in association with said light, subject to incoming current, for governing a ray from said light, a second mirror, said mirrors being so arranged that they reflect rays, the reflected rays constituting component rays for producing a resultant, an element $d$ serving to divide the light emanating from the source into two distinct pencils and to direct the same upon said mirrors, a signal translating device subject to the resultant, said signal translating device including a material whose resistance varies upon variation of the light to which it is subject, a source of current, and an electro-magnetic device.

12. A receiving apparatus of the class described, including a source of light, an electrically operated mirror located in association with said light, subject to incoming current, for governing a ray from said light, a second mirror, said mirrors being so angularly arranged that they reflect rays, the reflected rays constituting component rays for producing a resultant, an element $d$ serving to divide the light emanating from the source into two distinct pencils and to direct the same upon said mirrors, a signal translating device subject to the resultant, said signal translating device including a material whose resistance varies upon variation of the light to which it is subject, a source of current, and an electro-magnetic device.

13. A receiving apparatus of the class described, including a source of light, means for subdividing a pencil of the light, means operated by incoming current, for varying the phase of the subdivided portions of the light, and a signal translating device subject to the resultant of said subdivided portions of the light.

14. A receiving apparatus of the class described, including a source of light, an element $d$ for subdividing a pencil of the light, two mirrors upon which the subdivided portions of the light are directed and from which this light is reflected, said mirrors being so related that the light they reflect constitute components of a resultant, the element $d$ coöperating with the mirrors in merging these components into said resultant, means subject to incoming current, whereby one of said mirrors is operated to vary the phase of the reflected portions of the light, and a signal translating device subject to the resultant of said subdivided portions of the light.

15. A receiving apparatus of the class described, including a source of light, means for subdividing a pencil of the light, means operated by incoming current, for varying the phase of the subdivided portions of the light, and a signal translating device subject to the resultant of said subdivided portions of the light, said signal translating device including a material whose resistance varies upon variation of the light to which it is subject.

16. A receiving apparatus of the class described, including a source of light, an element $d$ for subdividing a pencil of the light, two mirrors upon which the subdivided portions of the light are directed and from which this light is reflected, said mirrors being so related that the light they reflect constitute components of a resultant, the element *d* coöperating with the mirrros in merging these components into said resultant, means subject to incoming current, whereby one of said mirrors is operated to vary the phase of the reflected portions of the light, and a signal translating device subject to the resultant of said subdivided portions of the light, said signal translating device including a material whose resistance varies upon variation of the light to which it is subject.

17. A receiving apparatus of the class described including an interferometer, an electro-magnet taking part in the operation of the interferometer, and a signal translating device governed by the interferometer.

18. A receiving apparatus of the class described including an interferometer, an electro-magnet taking part in the operation of the interferometer, and a signal translating device governed by the interferometer, the circuit of said signal translating device including a resisting element whose resistance is variable by the action of the light governed by the interferometer.

19. A receiving apparatus of the class described including an interferometer, an electro-magnet taking part in the operation of the interferometer, and a signal translating device governed by the interferometer, the circuit of said signal translating device including a selenium cell whose resistance is variable by the action of the light governed by the interferometer.

20. A receiving apparatus of the class described including an interferometer, an electro-magnet subject to incoming current and taking part in the operation of the interferometer, and a signal translating device governed by the interferometer, said interferometer including an illuminant and a movable part, by the position of which part the interference of the resultant ray is controlled, said electro-magnet controlling the position of said movable part, said signal translating device operating to distinguishably translate electrically the volume of light in the resultant ray.

21. A receiving apparatus of the class described including an interferometer, an electro-magnet subject to incoming current and taking part in the operation of the interferometer, and a signal translating device governed by the interferometer, the circuit of said signal translating device including a resisting element whose resistance is variable by the action of the light governed by the interferometer, said inteferometer including an illuminant and a movable part, by the position of which part the interference of the resultant ray is controlled, said electro-magnet controlling the position of said movable part, said signal translating device operating to distinguishably translate electrically the volume of light in the resultant ray.

22. A receiving apparatus of the class described including an interferometer, an electro-magnet subject to incoming current and taking part in the operation of the interferometer, and a signal translating device governed by the interferometer, the circuit of said signal translating device including a selenium cell whose resistance is variable by the action of the light governed by the interferometer, said interferometer including an illuminant and a movable part, by the position of which part the interference of the resultant ray is controlled, said electro-magnet controlling the position of said movable part, said signal translating device operating to distinguishably translate electrically the volume of light in the resultant ray.

In witness whereof, I hereunto subscribe my name this 4th day of November A. D., 1905.

CHARLES G. ASHLEY

Witnesses:
G. L. CRAGG,
LEON STROH.